3,389,159
ORGANOPOLYSILOXANES
John M. Nielsen, Burnt Hills, N.Y., assignor to General
Electric Company, a corporation of New York
No Drawing. Filed Dec. 21, 1964, Ser. No. 420,178
6 Claims. (Cl. 260—448.2)

ABSTRACT OF THE DISCLOSURE

Organopolysiloxane fluids which have a viscosity of no more than 25,000 centistokes at 25° C. have the structure:

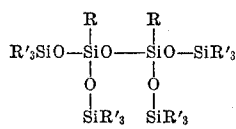

where R is a phenyl radical and each R' is independently selected from the class consisting of methyl radicals and phenyl radicals, at least one of said R' radicals being a phenyl radical. These fluids are useful as heat transfer fluids and hydraulic fluids under a wide temperature range.

---

This invention relates to organopolysiloxanes. More particularly, it relates to organopolysiloxane fluids having the structure:

(1)
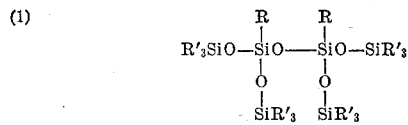

where R is a phenyl radical and each R' is independently selected from the class consisting of methyl radicals and phenyl radicals, at least one of said R' radicals being a phenyl radical.

Organopolysiloxane fluids of the formula:

(2)   R''$_3$Si—O—(R''$_2$SiO)$_a$SiR''$_3$ where R'' is any monovalent organic radical and $a$ is an integer of from 0 to 1,000, or even more, sometimes referred to as MDM fluids, are well-known in the art and have many advantageous properties. However, at extremely high temperatures, such fluids degrade rapidly, in particular forming cyclopolysiloxanes and shorter chain MDM fluids which evaporate at these extremely high temperatures. Organopolysiloxanes of the general formula:

(3)
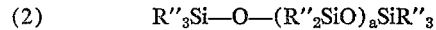

where Z is an aryl radical, Z' is an alkyl radical and $b$ is an integer of at least 1, have previously been disclosed. These materials have greater thermal stability than the aforementioned MDM organopolysiloxanes, chiefly due to the fact that they do not degrade readily to volatile cyclics. Because of these excellent high temperature characteristics, such materials have been described as useful as heat-transfer agents, as liquids for thermometers and thermoregulators, and as diffusion pump fluids, for example, in U.S. Patent 3,012,052 to Simmler et al. While the Simmler et al. patent describes material where Z is phenyl, Z' is methyl, and $b$ is 2, as fluid, in actuality, it is a waxy solid, at room temperature, the impression of fluidity being derived from the fact that the materials were not completely purified, retaining small amounts of the material of Formula 3 where $b$ is 1. At high temperatures, especially under vacuum conditions, the impurities can evaporate and, then when the fluid is again cooled to room temperature, a waxy solid results. In a situation where it is desired to impart motion to the fluid, such as by pumping, the solidification is, of course, extremely undesirable as the prime mover and fluid reservoir must be heated prior to resuming operations. Additionally, the solidification of the "fluid" may cause great damage to a pump designed for relatively low viscosity fluids.

In accordance with the present invention, it has unexpectedly been discovered that a pumpable fluid can be formulated having the same basic structure as those of Formula 3, and therefore the corresponding advantages, and, in addition, maintaining fluidity at room temperature and below. Thus, these materials are extremely useful for high temperature heat-transfer fluids and, in some cases, for diffusion pump fluids, and are pumpable under all conditions from room temperature and below to extremely high temperatures.

Briefly, the novel organopolysiloxanes of the present invention are pumpable fluids having a maximum viscosity at 25° C. of 25,000 centistokes and having the formula:

(1)
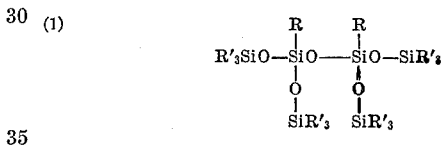

where R is a phenyl radical, each R' is independently selected from the class consisting of methyl radicals and phenyl radicals, at least one R' is a phenyl radical, and when none of the —SiR'$_3$ groups are triphenylsilyl groups, the maximum phenyl to methyl ratio is 2.5; when triphenylsilyl groups are present, the maximum phenyl to methyl ratio is 1.8, with the exception that when all the —SiR'$_3$ groups are trimethylsilyl and triphenylsilyl, the phenyl to methyl ratio is in the range of from 0.6 to 1.3. Preferably, none of the —SiR'$_3$ groups is entirely phenyl-substituted.

Thus, included among the compounds of the present invention are those described by the formulas:

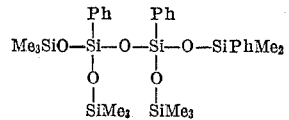

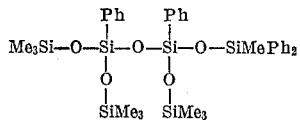

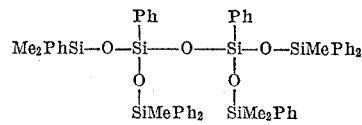

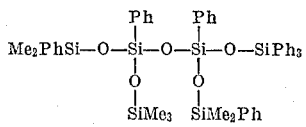

where Me is a methyl radical and Ph is a phenyl radical. This listing of specific compounds should not be taken as limiting, but only as illustrative of those covered by the present invention.

When each of the —SiR′$_3$ groups in Formula 1 is a group of the formula —SiMe$_3$, the symmetry of the molecule causes the compound to be a waxy solid. When at least one of the methyl radicals is replaced by a phenyl radical, the molecular symmetry is broken and the resulting compound is a fluid. However, when a large number of the methyl radicals are replaced by phenyl radicals, especially in a particular configuration, the high phenyl content of the molecule creates a tendency toward extremely viscous fluids or glassy, amorphous solids at room temperature. Especially, when —SiR′$_3$ groups are present, when each of the R′ radicals is phenyl, the highly crystalline nature of the triphenylsilyl group is able to induce the formation of a waxy solid even when the remainder of the —SiR′$_3$ groups are entirely methyl-substituted. When an average of at least 1.1 of the —SiR′$_3$ groups in the molecule are totally phenyl-substituted, the remainder of the R′ radicals being methyl, the crystalline tendency of the triphenylsilyl group is overcome, and the material remains fluid at room temperature. However, as the number of triphenylsilyl groups in the molecule is increased, the viscosity of the corresponding compound rises rapidly. Thus, when an average of more than about 1.5 triphenylsilyl groups are present in a compound of Formula 1, the viscosity of the material becomes excessive, rising to over 25,000 centistokes at 25° C., and is essentially, no longer easily pumpable at room temperature. However, as the crystalline tendency exists, it is preferred that none of the —SiR′$_3$ groups contain more than two phenyl substituents. It has unexpectedly been discovered, however, that even with the tendency of the all-methyl substituted system to form a waxy solid and the tendency of even the partially —SiPh$_3$ substituted system to form a waxy solid or an extremely viscous fluid, in the absence of any all-phenyl substituted —SiR′$_3$ groups the organopolysiloxane of Formula 1 will remain fluid at and below room temperature regardless of the degree of phenyl substitution, so long as at least one of the R′ groups is a phenyl radical. Each of these fluids will have a viscosity below about 25,000 centistokes at room temperature even in the absence of other impurities.

The organopolysiloxanes of Formula 1 can be prepared by a variety of methods. However, the preferred method involves the hydrolysis of sym-tetrachlorodiphenyldisiloxane and the reaction of the resultant sym-tetrahydroxydiphenyldisiloxane with the desired triorganochlorosilanes in a particular order. Cohydrolysis of the tetrachlorodiphenyldisiloxane with the triorganochlorosilane, a process similar to that described in the aforementioned Simmler et al. patent, is not workable with the present system due to the variety of substituents on the triorganosilyl groups (—SiR′$_3$). Not only are compounds of Formula 1 formed in such a cohydrolysis, but additionally, many compounds of Formula 3 where b is an integer of at least one. The partially phenyl-substituted organopolysiloxanes of Formula 1 have a wide range of boiling points, depending upon the type and number of phenyl substituents. Thus, a cohydrolysis which formed a variety of polymers of Formula 3 would cause the intermixing of the lower boiling members of a polymer of Formula 3 where b is, for example, 3, with the higher boiling members of the desired organopolysiloxane of Formula 1. Additionally, while it would theoretically be possible to hydrolyze the triorganochlorosilane to the silanol and react this with the tetrachlorodiphenyldisiloxane, non-distillable by-products such as hexakis(triorganosiloxy) tetraphenyltetrasiloxane, are formed. While the described preferred process may yield triorganosilanols, these materials are easily removed by distillation, even if the condensation product, hexaorganodisiloxane, is formed.

The reaction steps of the process may be illustrated in general as follows:

(4)    $2RSiCl_3 + H_2O \longrightarrow (RSiCl_2)_2O + 2HCl$ (5)    $(RSiCl_2)_2O + 4H_2O \longrightarrow [RSi(OH)_2]_2O + 4HCl$ (6)
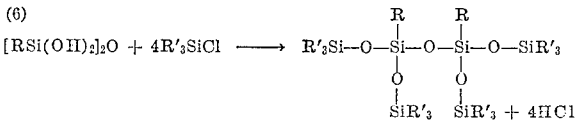

The step described in Equation 4 is conducted in the presence of hydrogen chloride and a compound selected from the class consisting of carbon-phosphorous compounds and carbon-nitrogen compounds, as described and claimed in my copending application Ser. No. 367,248, filed May 13, 1964, and assigned to the same assignee as the present invention. The reaction described by Equation 5 is conducted in a dilute acetone solution in the presence of sodium bicarbonate. The weight ratio of acetone to tetrachlorodiphenyldisiloxane should be in the ratio of at least 2:1, there being no maximum limit except for the economies involved. There should be from a two-fold to four-fold, or greater, excess of the sodium bicarbonate, based on the amount of available hydrolyzable chlorine. The amount of water present should be kept as low as conveniently possible, preferably less than 1.5 percent. Thus, the acetone should be as dry as possible, although a technical grade of the material is acceptable with the method of this invention. If the acetone is present in an amount of at least 5 times that of the disiloxane, even in the absence of another solvent, the reaction mixture can be easily stirred upon completion of the reaction. This step of the reaction is carried out by stirring a suspension of the sodium bicarbonate and acetone and cooling. The suspension is formed and cooled to about —10° C. or below, and the tetrachlorodiphenyldisiloxane is added at such a rate as to keep the temperature at 0° C., or below. Preferably, the disiloxane is added in a solvent solution, but the solvent should not be acetone as additional undesired water would then be added generating undesired hydrogen chloride. Any dry, inert solvent, such an ether, or hydrocarbons, can be used, for example, in a weight ratio of 1:1. Ether is preferable. As soon as all of the disiloxane has been added, the cooling medium is removed and the temperature of the reaction mixture is allowed to rise to a maximum of 25° C., but preferably is kept at about 15° C. The reaction mixture is filtered to remove the sodium chloride and excess sodium bicarbonate, and is preferably used immediately.

In Equation 6, the addition of the triorganosilyl groups to the tetrahydroxydiphenyldisiloxane is described. This reaction is conducted in the presence of a promoter and acid acceptor, such as pyridine, to absorb the generated hydrogen chloride and the order of addition of the various triorganochlorosilanes is important. Generally, the triorganosilyl group which is the smallest in size is added last, when a mixture of groups of the formula —SiR′$_3$ is to be present, as the smaller triorganochlorosilanes are most reactive to the remaining sites available on the disiloxane. However, a portion of the triorganochlorosilane will be lost as hexaorganodisiloxane or triorganosilanol due to the reaction of the silane with water remaining in the tetrahydroxydiphenyldisiloxane filtrate. Therefore, the material which is added first should be one which forms the lowest boiling impurity, that is the hexaorganodisiloxane and triorganosilanol and, additionally, the one which is lowest in cost so that its loss is not as economically important. To counterbalance these two considerations, as the smallest triorganochlorosilane in size forms the lowest boiling hexaorganodisiloxane and, additionally, as the present price of these silanes varies essentially directly with their size, the most convenient procedure is to add a portion of the smallest silane first, followed by all of the other silanes, and finally the smallest silane again to complete the reaction. For example, when the compound of Formula 1 is to contain —SiR′₃ groups which are both completely methyl-substituted and such groups wherein one of the substituents is phenyl, a portion of trimethylchlorosilane is first added, followed by all of the phenyldimethylchlorosilane, followed by the remainder of the necessary trimethylchlorosilane.

An alternate procedure is possible when stable triorganosilanols are available. The only stable silanols, within the scope of the present invention, are triphenylsilanol and diphenylmethylsilanol. When these are used, they must be anhydrous and may be dried, for example, by an azeotropic distillation with toluene. The stable silanol is then reacted with the tetrachlorodiphenyldisiloxane, the reaction product being hydrolyzed in acetone and sodium bicarbonate at low temperature to form a diphenyldisiloxane silanol which is partially substituted with triorganosiloxy units. This product is then reacted with triorganochlorosilanes, as in the previous description, to complete reaction to the final product.

Regardless of the method used, the hydrolysis reaction to form silanols must be performed in cold solution to prevent condensation, that is, less than 0° C., preferably less than —10° C. After reaction of the various triorganochlorosilanes with the silanol material, a low pressure distillation is run to separate cuts according to the varying phenyl contents.

The following examples are illustrative of the formation of the products of the present invention and should not be considered as limiting in any way the full scope of the invention as covered in the appended claims.

Example 1

A suspension was formed containing 92 g. (1.1 moles) of sodium bicarbonate in 160 g. of acetone. The suspension was stirred and cooled below —10° C. While continuing stirring, 44 g. (0.119 mole) of sym-tetrachlorodiphenyldisiloxane, having a boiling point at 3 mm. of 125°–127.5° C., was added. When addition was complete, stirring was continued while the temperature was allowed to rise to 15° C., and the reaction mixture was filtered. A second mixture was formed containing 126 g. (0.542 mole) of freshly distilled diphenylmethylchlorosilane, having a boiling point at 0.9 mm. of 110°–115° C., 43 g. of pyridine (0.544 mole), and 200 g. of dry toluene. This mixture was stirred and to it was added the filtrate resulting from the hydrolysis of the tetrachlorodiphenyldisiloxane, while maintaining the temperature below 30° C. The mixture was stirred at room temperature and was then allowed to stand overnight. After standing, the mixture was refluxed for 3 hours and the solvent was then distilled off, at atmospheric pressure, to a pot temperature of 105° C. The residue was treated with 50 g. of water to hydrolyze excess diphenylmethylchlorosilane and dissolve the pyridine hydrochloride salt, and the resulting oil layer was separated. This oil layer was washed with dilute hydrochloric acid and then neutralized with excess sodium bicarbonate. It was azeotroped to remove remaining water and was then filtered. The product fluid was stripped to 350° C. pot temperature at a pressure of 1 mm. and the 59 g. of the stripped fluid resulting was subjected to distillation in a Hickman molecular still. The following cuts resulted from the distillation in the Hickman still:

| Cut No.: | Approximate Pot Temperature (° C.) | Pressure (Microns) | Quantity (g.) |
|---|---|---|---|
| 1 | To 360 | 30 | 1 |
| 2 | 360–420 | 30 | 6 |
| 3 | 420 | 10 | 11 |
| 4 | Residue | | ca. 41 |

Cut 3 was tested and showed a refractive index $n_D^{20}$ 1.5916, a viscosity of about 25,000 centistokes, and an acidity of 215 p.p.m. of hydrogen chloride. The material was also tested by nuclear magnetic resonance and showed a phenyl to methyl ratio of 2.5. This corresponds exactly with the structure:

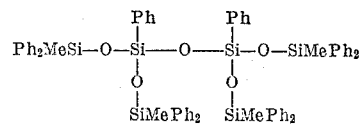

Example 2

A mixture containing 150 g. of toluene and 36 g. of triphenylsilanol was azeotroped to dryness. The warm solution was added to a mixture of 33 g. of sym-tetrachlorodiphenyldisiloxane, having a boiling point at 3 mm. of 125°–127.5° C., 70 g. of dry toluene, and 10.3 g. of pyridine, while maintaining the pot temperature below 40° C., with stirring. When the addition was completed, the mixture was heated to reflux for 15 minutes. The reaction mixture was cooled and filtered to remove pyridine hydrochloride after which it was stripped under vacuum, to free the mixture of toluene and dissolved pyridine hydrochloride. The mixture was subsequently cooled and the resulting 57 g. of viscous fluid was dissolved in 60 g. of anhydrous ethyl ether. This solution was added to a stirred slurry, maintained below —20° C., of 80 g. of sodium bicarbonate and 75 g. of acetone. On completion of the addition, the temperature of the new mixture was allowed to rise to about 15° C., while continuing stirring. The product was filtered through acetone-washed Celite to remove salts.

Another stirred mixture containing 37 g. of trimethyl chlorosilane, in excess of 99% purity, 27 g. of pyridine, and 110 g. of dry toluene was prepared in a reaction vessel equipped with a dropping funnel. The hydrolyzed filtrate resulting from the reaction of the triphenylsilanol and the tetrachlorodiphenyldisiloxane was placed in a dropping funnel and slowly added to the trimethylchlorosilane mixture, while maintaining the temperature below 15° C. Following addition, the mixture was heated and stirred and the solvent was distilled off to a head temperature of 90° C. The residue was then hydrolyzed with 42 g. of water, the aqueous layer separated, and the oil layer washed with 50 g. of dilute hydrochloric acid and neutralized with excess sodium bicarbonate. The neutralized oil was azeotroped dry and filtered, and the filtrate was stripped of solvent and vacuum distilled into five cuts. The major cuts, 2 and 4, were subsequently redistilled. The boiling points, distillation pressure, and weight obtained for each of the cuts is listed in the following table:

| Cut No.: | Approximate Boiling Point (° C.) | Pressure (mm.) | Quantity (g.) |
|---|---|---|---|
| 1–0 | To 240 | 0.7 | 2 |
| 2–1 | 210–230 | 0.7 | 3 |
| 2–2 | 230–247 | 0.7 | 3.5 |
| 2–3 | 247–255 | 0.7 | 5.5 |
| 2–4 | 255–259 | 0.7 | 12 |
| 2–5 | Residue | 0.7 | 2.5 |
| 3–0 | 265–300 | 1.0 | 4 |
| 4–1 | To 300 | 1.0 | 2.5 |
| 4–2 | 300–330 | 1.0 | 5 |
| 4–3 | 330–340 | 1.0 | 8.5 |
| 4–4 | 340–352 | 1.0 | 3.5 |
| 4–5 | Residue | 1.0 | 1.5 |
| 5–0 | 365 | 1.0 | 0.5 |

Cuts 1–0 thru 2–2 were hazy liquids, indicating incompatible mixtures

[(Ph₃Si)₂O impurity]

while in cut 5–0, a viscous liquid, some solids separated on long standing. Cut 2–4 was a homogeneous liquid which on cooling became a mixture of a solid and a liquid. This mixture was filtered, the homogeneous fluid filtrate showing, by nuclear magnetic resonance, a phenyl to methyl ratio of 0.61, while the waxy solid, purified by methanol and water extractions, by the same method, showed a phenyl to methyl ratio of 0.56. The 0.56 ratio corresponds to the structure:

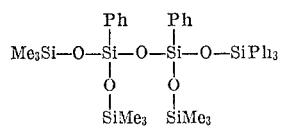

An elemental analysis was run on the waxy solid, showing 61.0% carbon, 6.7% hydrogen, and 24.0% silicon. This corresponded well with the theoretical percentages of 60.9% carbon, 6.8% hydrogen, and 21.9% silicon, the higher analytical percentage of silicon explainable by the possible failure to completely break silicon-carbon bonds during analytical degradation. The phenyl to methyl ratio of 0.61 corresponds with a material of Formula 1 having an average composition of 1.1 triphenylsilyl groups and 2.9 trimethylsilyl groups and represents the lower limit of triphenylsilyl content for fluidity with only trimethylsilyl groups.

Cut 2–5, the residue of cut 2, had a viscosity of about 30,000 centistokes. By nuclear magnetic resonance, this material showed a phenyl to methyl ratio of 1.34, or two triphenylsilyl groups and two trimethylsilyl groups. Each of the homogeneous fluid materials of cuts 4–2 thru 4–5 showed viscosities over 80,000 centistokes, the residue being over 1 million. The nuclear magnetic resonance-phenyl to methyl ratio ranged from 1.37 to 1.9, corresponding to an average of from 2 to 2.4 triphenylsilyl groups, and an average of from 2 to 1.6 trimethylsilyl groups in a material of Formula 1. Thus, the materials prepared in this example show that the substitution ranges to prepare pumpable fluids, when using triphenylsilyl substituents, is greater than 1 and less than 2 of these triphenylsilyl groups. For certainty in preparing a fluid, having a room temperature viscosity of 25,000 centistokes or less, I have set a limit of about 1.5 triphenylsilyl groups, or a phenyl to methyl ratio of 1.3.

Example 3

In this example the triorganosilyl substituents were selected from triphenylsilyl and phenyldimethylsilyl groups. A quantity of 20 g. of triphenylsilanol was azeotroped dry with 100 g. of toluene. This dry solution was added, while still warm, to a stirred mixture containing 27 g. of tetrachlorodiphenyldisiloxane, 75 g. of dry toluene, and 7 g. of pyridine, this mixture being maintained below 40° C. Following addition, the mixture was refluxed for 45 minutes, cooled, filtered, and stripped of solvent. Anhydrous ether was added to the residue and the ether solution was added to a stirred slurry containing 80 g. of sodium bicarbonate and 50 g. of acetone, the slurry being maintained at a temperature below −10° C. On completion of addition, the reaction mixture was stirred and allowed to warm to 10–15° C., and was then filtered. The filtrate was held for the next step.

A mixture was prepared containing 150 g. of dry toluene, 51 g. (excess) of phenyldimethylchlorosilane, and 25 g. of pyridine. This mixture was stirred and placed in a water-cooled bath. The previously described filtrate was added to the mixture, and the new reaction mixture was heated to a pot temperature of 90° C., distilling off solvent. A quantity of 50 g. of distilled water was added, hydrolyzing unreacted chlorosilane and dissolving pyridine hydrochloride salts. The oil layer resulting from the hydrolysis was separated, washed with 2 portions of dilute hydrochloric acid, and neutralized with sodium bicarbonate. The neutralized oil layer was filtered, stripped of solvent, and distilled into 7 cuts and a residue, the 7th cut being subjected to further distillation, with results as follows:

| Cut No.: | Distillation Temperature (° C.) | Pressure (mm.) | Quantity (g.) |
|---|---|---|---|
| 1–0 | | | |
| 2–0 | To 290 | 0.9 | 4 |
| 3–0 | | | |
| 4–0 | 290–320 | 1.3 | 0.5 |
| 5–0 | 320–340 | 1.3 | 7.5 |
| 6–0 | 340–353 | 1.2 | 23 |
| 7–1 | To 340 | 1.5 | 3.5 |
| 7–2 | 340–360 | 1.5 | 7.0 |
| 7–3 | 360–380 | 1.5 | 3.0 |
| 7–4 | 380–390 | 1.5 | 1.0 |
| 7–5 | Residue | | 1.5 |
| 8–0 | >390 | 1.2 | 5.0 |

Cut 5–0 was found to have a viscosity at 25° C., of 883 centistokes and an index of refraction $n_D^{20}$ of 1.5700. By nuclear magnetic resonance, it was determined to have a phenyl to methyl ratio of 1.44, corresponding to an average of 1.1 triphenylsilyl groups and 2.9 phenyldimethylsilyl groups. Cut 7–2 was similarly tested and found to have a viscosity, at 25° C., of 1840 centistokes, an index of refraction $n_D^{20}$ 1.5732, and a phenyl to methyl ratio of 1.57, corresponding to an average of 1.3 triphenylsilyl groups and 2.7 phenyldimethylsilyl groups. Cut 7–4, with a phenyl to methyl ratio, by nuclear magnetic resonance, of 1.85, corresponding to an average of 1.6 triphenylsilyl groups and 2.4 phenyldimethylsilyl groups, was found to have a room temperature viscosity, of about 30,000. Correspondingly, 7–5 with an average of 1.8 triphenylsilyl groups and 2.2 phenyldimethylsilyl groups had a viscosity of about 500,000 centistokes, at 25° C. Thus, it can again be seen that when a material of Formula 1 has less than about 1.5 triphenylsilyl groups, while at least 1 phenyl substituent on the triorganosilyl groups, or a phenyl to methyl ratio of up to 1.8, a pumpable fluid, that is, one with a viscosity of less than about 25,000 centistokes, is obtained.

Example 4

In this example, the triorganosilyl groups were phenyldimethylsilyl and diphenylmethylsilyl groups. A suspension was prepared containing 700 ml. of sodium sulphate-dried acetone and 255 g. of powdered sodium bicarbonate. The suspension was stirred and cooled below 0° C. whereupon 190 g. of tetrachlorodiphenyldisiloxane was added over a period of 1.1 hours. The reaction product was stirred and allowed to warm almost to room temperature whereupon the mixture was filtered using Celite, the filter cake washed with additional acetone, and the wash added to the filtrate.

The filtrate was stirred, while maintaining a temperature of 10°–20° C. and a solution containing 91 g. of phenyldimethylchlorosilane, 44 g. of pyridine, and 135 g. of dry toluene was added. Following this addition, a second solution containing 243 g. of diphenylmethylchlorosilane, 92 g. of pyridine, and 200 g. of dry toluene was added. This reaction mixture was stirred for about 20 minutes whereupon a third solution containing 100 g. of phenyldimethylchlorosilane, 48 g. of pyridine, and 100 g. of dry toluene was added. Following the last addition, the reaction mixture was slowly heated to 90° C. pot temperature, distilling off solvent. The residue was hydrolyzed with 150 g. of water, the oil layer separated, washed with dilute hydrochloric acid, neutralized with excess sodium bicarbonate, azeotroped dry, and filtered. The solvent was stripped from the filtrate and the residue distilled into 4 cuts and a residue; portions of cuts 3 and 4 were redistilled, with the following results:

| | Distillation Temperature (° C.) | Pressure (mm.) | Quantity (g.) |
|---|---|---|---|
| Cut No.: | | | |
| 1-0 | 125-205 | 3 | 65 |
| 2-0 | 205-270 | 3 | 17 |
| 3-0 | 270-355 | 3 | 130 |
| 3-1 } 3-2 } | To 240 | 1 | 15 |
| 3-3 | 240-260 | 1 | 5 |
| 3-4 | 260-290 | 1 | 15 |
| 3-5 | To 270 | 0.35 | 5 |
| 3-6 | 270-280 | 0.35 | 7 |
| 3-7 | 280-290 | 0.35 | 19 |
| 3-8 | 290-310 | 0.35 | 10 |
| 3-9 | Residue | | 37 |
| 4-0 | 355-380 | 3 | 115 |
| 4-1 | 275-300 | 0.6 | 1 |
| 4-2 | 300-320 | 0.6 | 4 |
| 4-3 | 320-328 | 0.6 | 6.5 |
| 4-4 | 328-340 | 0.6 | 10 |
| 4-5 | Residue | | 3 |
| 5-0 | Residue | | 156 |

The viscosities, refractive indices, and phenyl to methyl ratios, as determined by nuclear magnetic resonance, were measured for several of the previously described cuts. The results of these tests are shown in the following table, where B represents the average number of phenyldimethylsilyl groups in Formula 1 and C represents the average number of diphenylmethylsilyl groups in Formula 1:

| | Viscosity (Centistokes at 25° C.) | Refractive Indices ($n_D^{20}$) | Ph/Me | B | C |
|---|---|---|---|---|---|
| Cut No.: | | | | | |
| 3-6 | 115 | 1.547 | | | |
| 3-7 | | 1.5510 | 0.95 | 3.2 | 0.8 |
| 3-8 | | 1.5552 | 1.03 | 2.9 | 1.1 |
| 3-9 | 810 | 1.5692 | 1.36 | 1.9 | 2.1 |
| 4-4 | | 1.5755 | 1.58 | 1.4 | 2.6 |
| 4-5 | 4,000 | 1.5808 | 1.80 | 1 | 3 |

The accuracy of the nuclear magnetic resonance test for the number of phenyl and methyl substituents present was again determined by running an elemental analysis for cut 3–7. As noted in the table above, by the nuclear magnetic resonance test, this cut was determined to have an average of 3.2 phenyldimethylsilyl substituents and 0.8 diphenylmethylsilyl substituents in a compound of Formula 1. The analytical results of an elemental analysis showed 65.7% and 65.5% carbon, 6.2% and 6.4% hydrogen, and 19.1% silicon, corresponding extremely well with the theoretical percentages of 65.5% carbon, 6.3% hydrogen, and 19.1% silicon. Thus, it can be seen from the above data, particularly in combination with the results in Example 1, that any ratio of phenyldimethylsilyl units and diphenylmethylsilyl units in a material of Formula 1 falls within the viscosity range of a pumpable fluid.

Example 5

In this example, a mixture of trimethylsilyl and phenyldimethylsilyl units were utilized. A solution was prepared containing 1200 ml. of acetone, 100 g. of anhydrous sodium sulphate, and 560 g. of sodium bicarbonate. This solution was stirred and cooled to a temperature of from −5 to −25° C. and 362 g. (0.984 mole) of tetrachlorodiphenyldisiloxane (38.33% chlorine) were added dropwise over a period of 1¾ hours. The temperature of the solution was allowed to rise to 5° C. following the addition and the solution was then filtered through a Celite filter cake. The filter cake was subsequently washed with 800–900 ml. of sodium sulfate-dried acetone and the wash was combined with filtrate.

The temperature of the filtrate-wash was maintained below 10° C. and a solution containing 165 g. (1.5 mole) of trimethylchlorosilane, 130 g. (1.65 mole) of pyridine, and 400 g. of toluene was added. Subsequently, a solution containing 341 g. (2.0 moles) of phenyldimethylchlorosilane and 1.76 g. (2.2 moles) of pyridine was added, followed by a third solution containing 136 g. (1.25 moles) of trimethylchlorosilane and 115 g. (1.46 moles) of pyridine. Following addition of the various solutions, the mixture was stirred and allowed to warm to room temperature and was then heated to a pot temperature of 100° C. to distill off solvent. The residue was hydrolyzed with 250 g. of water, the water layer removed, the oil layer washed twice with dilute hydrochloric acid, neutralized with excess sodium bicarbonate, dried with sodium sulfate, and filtered. The filtrate was stripped of solvent and vacuum distilled to get four cuts and a residue, portions of two of the cuts being redistilled with the following results:

| | Boiling Point (° C.) | Pressure (mm.) | Quantity (g.) |
|---|---|---|---|
| Cut No.: | | | |
| 1-0 | To 145 | 0.6 | 50 |
| 2-0 | 145-210 | 0.9 | 23 |
| 3-0 | 210-265 | 0.9 | 173 |
| 3-1 | To 210 | 0.9 | 4.5 |
| 3-2 | 210-220 | 0.9 | 16 |
| 3-3 | 220-227 | 0.9 | 14 |
| 3-4 | 227-235 | 0.9 | 55 |
| 3-5 | To 237 | 1.1 | 4 |
| 3-6 | 237-253 | 1.1 | 34 |
| 3-7 | Residue | | 17 |
| 4-0 | 265-360 | 1.0 | 265 |
| 4-1 } 4-2 } | To 220 | 0.3 | 6.5 |
| 4-3 | 220-235 | 0.2 | 20.5 |
| 4-4 | 235-250 | 0.2 | 44 |
| 4-5 | Residue | | 37.5 |
| 5-0 | Residue | | 95 |

Several of the cuts in this example were tested for viscosity, refractive index, and phenyl to methyl ratio, by nuclear magnetic resonance. The results of those tests are shown in the following table, where A represents the average number of trimethylsilyl groups and B represents the average number of phenyldimethylsilyl groups in a material of Formula 1:

| | Viscosity (Centistokes at 25°C.) | Refractive Index ($n_D^{20}$) | Ph/Me | A | B |
|---|---|---|---|---|---|
| Cut No.: | | | | | |
| 3-2 | 34 | 1.4938 | 0.35 | 2.4 | 1.6 |
| 3-3 | | 1.4953 | | | |
| 3-4 | | 1.5024 | 0.40 | 2 | 2 |
| 3-5 | | 1.5052 | | | |
| 3-6 | | 1.5094 | 0.46 | 1.6 | 2.4 |
| 3-7 | 64 | 1.5187 | 0.53 | 1.1 | 2.9 |
| 4-1 } 4-2 } | | 1.5178 | | | |
| 4-3 | | 1.5192 | | | |
| 4-4 | 80 | 1.5236 | 0.55 | 1 | 3 |

Thus, as in the case of the mixture of phenyldimethylsilyl and diphenylmethylsilyl units, when a material of Formula 1 has a mixture of trimethylsilyl and phenyldimethylsilyl units, so long as an average of at least 1 of the units present is phenyldimethylsilyl, the resulting material is a pumpable fluid with a viscosity below 25,000 centistokes.

It can be seen from the foregoing examples that organopolysiloxane materials having the structure:

(1)
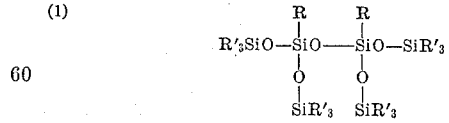

where R is a phenyl radical, each R′ is independently selected from the class consisting of methyl radicals and phenyl radicals, and at least one of the R′ groups is a phenyl radical, are pumpable fluids at room temperature. and even below, up to phenyl to methyl ratios of 2.5 in the absence of triphenyl silyl groups. When triphenylsilyl groups are present, the maximum phenyl to methyl ratio is 1.8, with the exception that when all the —SiR′₃ groups are trimethylsilyl and triphenylsilyl, the phenyl to methyl ratio is in the range of from 0.6 to 1.3. Preferably, none of the —SiR′₃ groups is entirely phenyl-substituted.

The materials described also show excellent heat stability. Three of these materials were subjected to a temperature of 650° F. under a nitrogen atmosphere at 760 mm. and suffered only the following weight losses:

| | 210 Hrs., Percent | 350 Hrs., Percent | 510 Hrs., Percent |
|---|---|---|---|
| Example 3 Cut No. 7-2 | 5.14 | 7.15 | 8.81 |
| Example 4 Cut No. 3-9 | 3.88 | 5.0 | 5.9 |
| Example 5 Cut No. 3-7 | 3.89 | 5.42 | 7.31 |

Although the fluids had yellowed somewhat, probably due to a slight oxidation of the fluid by traces of oxygen present in spite of the nitrogen atmosphere, they remained entirely mobile fluids. These fluids had initial viscosities varying from 64 for cut 3-7 of Example 5 to 1840 for cut 7-2 of Example 3, and phenyl to methyl ratios varying from 0.53 to 1.57 for the same fluids.

As a further comparison of the stability of the compounds of the present invention, a variety of organopolysiloxane fluids were tested at 700° F. under a nitrogen atmosphere, a more drastic test than the one at 650° F. The fluids of the present invention which were tested were cuts 3-9 of Example 4, which had a viscosity of 810 centistokes and a phenyl to methyl ratio of 1.36, and 3-7 of Example 5, which had a viscosity of 64 centistokes and a phenyl to methyl ratio of 0.53. When tested at 700° F. under a nitrogen atmosphere, the following weight losses were recorded:

| Time (Hrs.) | Cut 3-9, Example 4 | Cut 3-7, Example 5 |
|---|---|---|
| 64 | 11.4 | 11.7 |
| 161 | 20.4 | 19.5 |
| 208 | 27.7 | 26.5 |
| 326 | 40.0 | 36.6 |
| 419 | 47.0 | 40.9 |
| 537.5 | 53.2 | 45.6 |

At 560 hours, both of the materials of the present invention were still completely fluid and showed no signs of gelation. In contrast, dimethylpolysiloxane fluids with various viscosities were similarly subjected to 700° F. under a nitrogen atmosphere and showed the following weight losses at the times listed:

| Fluid Viscosity (Centistokes at 25° C.) | Time (Hours) | Weight Loss (Percent) |
|---|---|---|
| 50 | 180 | 69 |
| 100 | 180 | 78 |
| 1,000 | 135 | 87 |
| 10,000 | 65 | 95 |

By further contrast, two diorganopolysiloxanes containing both methyl and phenyl substituents were subjected to the 700° F. temperature under a nitrogen atmosphere. A series of methylphenylpolysiloxane fluids with phenyldimethylsilyl chain terminals, with a viscosity at 25° C. of 250 centistokes, a phenyl to methyl ratio between 0.9 and 1.0, and an index of refraction $n_D^{25}$ 1.5444, and having the approximate average formula:

$$PhMe_2SiO(SiMePhO)_8SiMe_2Ph$$

were subjected to the same conditions and had approximately the same weight losses at the same time. However, the last member of the series gelled at about 370 hours. Similarly, a diphenylmethylsilyl chain-terminated methylphenylpolysiloxane fluid with a viscosity of 1,000 centistokes, a phenyl to methyl ratio slightly over 1.0, and an index of refraction $n_D^{25}$ 1.561, and having the approximate average formula:

$$Ph_2MeSiO(SiMePhO)_8SiMePh_2$$

was tested and, while showing lower weight losses, e.g., 8 percent at 95 hours, 15 percent at 250 hours, and 21 percent at 360 hours, gelled at 379 hours. The 379 hour figure was again the last gelling member of the series. Thus, it is easily seen that materials having the structure of Formula 1 degenerate to a much lesser degree at high temperatures than those of Formula 2, and are significantly more stable than diorganopolysiloxanes having both phenyl and methyl substituents, with approximately the same phenyl to methyl ratios and viscosities. The MDM fluids of Formula 2 are less stable, chiefly, because they form cyclopolysiloxanes at higher temperatures and thus are more severely affected by such high temperatures due to the evaporation of these cyclics. In fact, as can be seen from the table above for the dimethylpolysiloxane fluids, the rate of degradation is even faster for higher viscosity fluids than for lower viscosity fluids.

Thus, the organopolysiloxane fluids described according to the present invention show particular utility as heat transfer fluids or as diffusion pump fluids, depending upon the phenyl to methyl ratio of the organopolysiloxane. Additionally, they are valuable as high temperature hydraulic fluids and as hydrodynamic lubricity improvers. As the phenyl content is increased over materials of the prior art which otherwise meet Formula 1, they show improved radiation resistance.

By comparison with the materials of the formula:

(7) 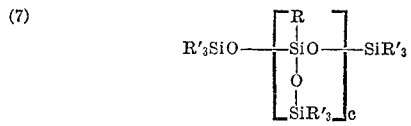

where R and R' are previously defined, and $c$ is an integral number of at least 3, even with the same phenyl to methyl ratios, the materials of the present invention are to be preferred. Chiefly, because of the lower molecular weight of the present materials, the viscosities of the fluids are generally lower for the same phenyl to methyl ratios and, similarly, since they are relatively nonvolatile, there is less danger of gelling for longer periods at a particular temperature. For similar reasons, these fluids are valuable as organopolysiloxane base fluids for high temperature greases, for example, for stopcocks.

While specific embodiments of my invention have been shown and described, the invention should not be limited to the specific compositions shown. It is intended, therefore, by the appended claims, to cover all modifications within the spirit and scope of this invention.

What I claim as new and desire to secure by Letters Patent of the United States is:

1. A pumpable organopolysiloxane fluid having a maximum viscosity at 25° C. of about 25,000 centistokes and having the formula:

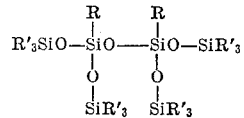

where R is a phenyl radical, each R' is independently selected from the class consisting of methyl radicals and phenyl radicals, at least one R' is a phenyl radical, and when none of the —SiR'$_3$ groups are triphenylsilyl groups, the maximum phenyl to methyl ratio is 2.5; when triphenylsilyl groups are present the maximum phenyl to methyl ratio is 1.8, with the exception that when all the —SiR'$_3$ groups are trimethylsilyl and triphenylsilyl, the phenyl to methyl ratio is in the range of from 0.6 to 1.3.

2. A pumpable organopolysiloxane fluid having a maximum viscosity at 25° C. of about 25,000 centistokes and having the formula:

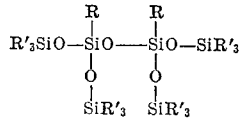

where each R is a phenyl radical, and each R' is independently selected from the class consisting of methyl radicals and phenyl radicals, at least one of said R' groups being a phenyl radical and no more than two of said R' radicals on each —SiR'$_3$ group being phenyl radicals.

3. The pumpable organopolysiloxane fluid of claim 2 having, on the average, two trimethylsilyl groups and two phenyldimethylsilyl groups.

4. The pumpable organopolysiloxane fluid of claim 2 having, on the average, one trimethylsilyl group and three phenyldimethylsilyl groups.

5. A pumpable organopolysiloxane fluid having the average formula:

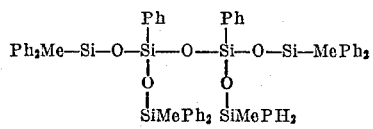

6. A pumpable organopolysiloxane fluid having the average formula:

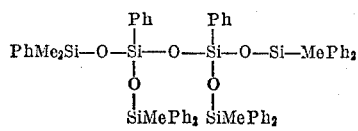

References Cited

UNITED STATES PATENTS 3,012,052  12/1961  Simmler _____ 260—448.2

OTHER REFERENCES

G. Grant, and C. C. Currie, Mech. Engng., New York, 1951, 73, 311.

TOBIAS E. LEVOW, *Primary Examiner.*

J. PODGORSKI, *Assistant Examiner.*